United States Patent
Gauvin

(10) Patent No.: US 9,455,892 B2
(45) Date of Patent: Sep. 27, 2016

(54) DATA LOSS MONITORING OF PARTIAL DATA STREAMS

(75) Inventor: William Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 1099 days.

(21) Appl. No.: 12/916,444

(22) Filed: Oct. 29, 2010

(65) Prior Publication Data

US 2012/0106366 A1  May 3, 2012

(51) Int. Cl.
*H04L 12/26* (2006.01)
*H04L 12/24* (2006.01)

(52) U.S. Cl.
CPC .......... *H04L 43/0835* (2013.01); *H04L 41/06* (2013.01); *H04L 41/0686* (2013.01)

(58) Field of Classification Search
USPC .............................. 370/252, 394; 375/240.16
See application file for complete search history.

(56) References Cited

U.S. PATENT DOCUMENTS

| | | | |
|---|---|---|---|
| 5,842,040 A | 11/1998 | Hughes et al. | |
| 8,250,085 B1* | 8/2012 | Satish | 707/758 |
| 8,495,705 B1* | 7/2013 | Verma et al. | 726/2 |
| 2002/0071421 A1* | 6/2002 | Chiu et al. | 370/349 |
| 2005/0060535 A1 | 3/2005 | Bartas | |
| 2006/0149820 A1 | 7/2006 | Rajan et al. | |
| 2006/0282874 A1* | 12/2006 | Ito et al. | 725/139 |
| 2007/0168545 A1 | 7/2007 | Venkatsubra et al. | |
| 2007/0211799 A1* | 9/2007 | Henocq et al. | 375/240.16 |
| 2007/0291108 A1* | 12/2007 | Huber et al. | 348/14.02 |
| 2008/0232374 A1 | 9/2008 | Kopelman et al. | |
| 2009/0265778 A1 | 10/2009 | Wahl et al. | |
| 2010/0023754 A1 | 1/2010 | Peled et al. | |
| 2010/0135165 A1* | 6/2010 | Parolari et al. | 370/252 |
| 2011/0083159 A1* | 4/2011 | Brown et al. | 726/1 |

FOREIGN PATENT DOCUMENTS

CN    101763479 A    6/2010

OTHER PUBLICATIONS

International Search Report and Written Opinion dated Feb. 27, 2015 in PCT/US11/58176 titled "Data Loss Monitoring of Partial Data Streams".
"Symantec Data Loss Prevention", , Oct. 1, 2008, XP055169912, Retrieved from the Internet: URL: http://www.mssuk.com/images/ Symantec 14552315_IRC_BR_DLP_03.09_sngl.pdf [retrieved on Feb. 16, 2015].

* cited by examiner

*Primary Examiner* — Donald Mills
*Assistant Examiner* — Henry Baron
(74) *Attorney, Agent, or Firm* — Wilmer Cutler Pickering Hale and Dorr LLP

(57) ABSTRACT

A method for detecting loss of sensitive information in partial data streams may include identifying partial data streams containing segments lost while capturing network traffic at a network computing device, determining characteristics of content of the partial data streams, padding content portions of the lost segments in the partial data streams, and scanning the partial data streams for sensitive information according to at least one data loss prevention (DLP) policy.

18 Claims, 10 Drawing Sheets

DATA LOSS MONITORING OF PARTIAL DATA STREAMS

FIELD OF INVENTION

Embodiments of the invention relate to the field of processing data, and more particularly, to data loss monitoring of partial data streams.

BACKGROUND OF THE INVENTION

An important aspect of Data Loss Prevention (DLP) involves monitoring network traffic for presence of sensitive information. Typically, fingerprints of sensitive information that requires protection are created and provided to a DLP monitoring device. The DLP monitoring device uses the fingerprints to detect the presence of sensitive information in various messages sent and received by computing devices of an organization. Sensitive information may be stored in a structured form such as a database, a spreadsheet, etc., and may include, for example, customer, employee, patient or pricing data. In addition, sensitive information may include unstructured data such as design plans, source code, CAD drawings, financial reports, etc.

A DLP monitoring device is usually a passive device that relies on network adapter cards and packet capture software which record network traffic to designated buffers. Because of the large amount of network traffic, the buffers may become full, causing some of the data packets to be lost. Currently, a DLP monitoring device drops data streams including lost data packets and does not scan such incomplete data streams for sensitive information. This, however, leads to severe implications with respect to reliability and integrity of DLP solutions.

SUMMARY OF THE INVENTION

A method and apparatus for data loss monitoring of partial data streams is described. An exemplary method of one embodiment includes identifying partial data streams containing segments lost while capturing network traffic at a network computing device, each partial data stream corresponding to a session, determining characteristics of content of the partial data streams, padding content portions of the lost segments in the partial data streams, and scanning the partial data streams for sensitive information according to at least one data loss prevention (DLP) policy. In one embodiment identifying partial data streams comprises capturing the network traffic containing a plurality of segments at the network computing device, creating a data stream each time a segment is identified as a first segment in the data stream based on a transport layer header of the segment, associating the data stream with a session, identifying segments that belong to the data stream using transport layer headers of the segments, identifying segments that are missing from the data stream, placing the missing segments on a lost segment queue, and upon receiving an end of stream indication or upon an expiration of a predefined time interval, marking the segments remaining on the lost segment queue as lost segments. In one embodiment, the exemplary method further includes identifying a data segment associated with a connection tuple for which a data stream has not been created, determining that a first segment associated with the connection tuple has been lost, creating a partial data stream based on the connection tuple, determining whether the partial data stream belongs to a previously created session, if the partial data stream does not belong to the previously created session, associating the partial data stream with a new session, and if the partial data stream belongs to the previously created session, migrating the partial data stream to the previously created session.

In one embodiment, determining characteristics of content portions of the partial data streams comprises inserting a begin marker and an end marker at a location of a lost segment in a partial data stream after identifying the lost segment, recording the location of the lost segment in a metadata store, and performing a protocol analysis for data stream elements of the partial data stream. In one embodiment, performing the protocol analysis for data stream elements of the partial data stream comprises determining a type for each data stream element, parsing each data stream element based on the type to extract metadata, and storing the metadata in a metadata store. In one embodiment, determining the type for each data stream element comprises identifying a parser corresponding to the type of the data stream element if the type of the data stream element is known, and if the type of the data stream element is not known, applying a plurality of signatures to the data stream element until finding a matching signature, each of the plurality of signatures corresponding to a particular type, identifying the type of the data stream element using the matching signature, and identifying a parser corresponding to the type of the data stream element. In one embodiment, applying the plurality of signatures to the data stream element may comprise aligning the data stream element to start at a first possible header tag, applying the plurality of signatures at each possible header tag, and identifying a header type using the matching signature. The header type may be an application layer protocol header, and the metadata extracted from the application layer protocol header may include at least one of sender information, recipient information, a data type and a data length. Alternatively, the header type may be a presentation layer header, and the metadata extracted from the presentation layer header may include a data format. The matching signature may use a header format and a plurality of tags associated with the header type, the plurality of tags comprising a plurality of primary tags and a plurality of additional tags. In one embodiment, identifying the type of the data stream element further comprises utilizing metadata collected when identifying a type of a prior data stream element of the data stream.

In one embodiment, padding the content portion of each lost segment in the partial data stream comprises identifying a location of each content portion present in the partial data stream, identifying a type of each content portion present in the partial data stream, tagging the content portion of each lost segment as invalid, determining whether a transformation of any content portion present in the partial data stream is required, and if the transformation of any content portion present in the partial data stream is required, identifying a type of the required transformation, and transforming the content portion using the identified type of the required transformation. In one embodiment, scanning the partial data streams for sensitive information according to the at least one DLP policy comprises identifying portions of content that are missing, and ignoring the portions of content that are missing when scanning the content for the sensitive information using signatures of the sensitive information. The content may be scanned using k-gram signatures. In one embodiment, upon detecting the sensitive information in a partial data stream, a violation of the DLP policy and a percentage of missing content in the partial data stream are reported.

In addition, a computer readable storage medium for data loss monitoring of partial data streams is described. An exemplary computer readable storage medium provides instructions, which when executed on a processing system causes the processing system to perform a method such as the exemplary methods discussed above.

Further, a network device data loss monitoring of partial data streams is described. An exemplary network device may include a memory, a processor, coupled to the memory, and a partial data stream subsystem, executed from the memory by the processor, to identify partial data streams containing segments lost while capturing network traffic at a network computing device, each partial data stream corresponding to a session, to determine characteristics of content of the partial data streams, to pad content portions of the lost segments in the partial data streams, and to scan the partial data streams for sensitive information according to at least one data loss prevention (DLP) policy. In one embodiment, the partial data stream subsystem comprises a protocol analyzer to perform a protocol analysis for data stream elements of a partial data stream using a plurality of signatures, a metadata store to store metadata extracted during the protocol analysis, a content manager to identify a location and a type of each content portion present in the partial data stream, to tag the content portion of each lost segment as invalid, and to transform any content portion present in the partial data stream that requires transformation, and a DLP scanner to identify portions of content that are missing, to ignore the portions of content that are missing when scanning the content for the sensitive information using signatures of the sensitive information, and to report a violation of the DLP policy and a percentage of missing content in the partial data stream upon detecting the sensitive information in a partial data stream.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for data loss monitoring of partial data streams is described. A network monitoring device captures network traffic and scans the captured traffic for the presence of confidential information such as customer, employee or patient data, design plans, source code, CAD drawings, financial reports, etc. Due to the large amount of traffic, the network monitoring device is not always able to capture all the data segments, causing some of the data streams to be incomplete. Embodiments of the present invention provide a technique that enables scanning of the incomplete (or partial) data streams for presence of confidential information, thus improving the reliability and integrity of data loss prevention (DLP) functionality of network monitoring devices.

In the following description, numerous details are set forth. It will be apparent, however, to one of ordinary skill in the art having the benefit of this disclosure, that embodiments of the present invention may be practiced without these specific details.

Figure 1:
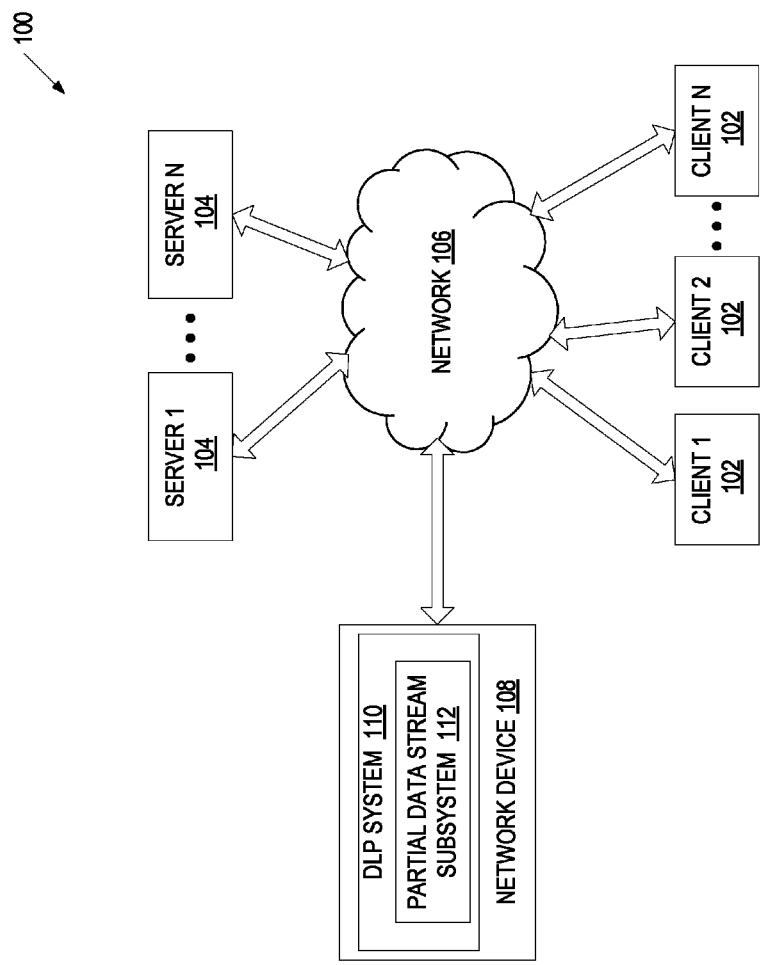
FIG. 1 is a block diagram of exemplary network architecture in which embodiments of the invention may operate.

FIG. 1 is a block diagram of an exemplary network architecture 100 in which embodiments of the invention may operate. The network architecture 100 may include one or more servers 104 and client devices ("clients") 102 coupled via a network 106 (e.g., public network such as the Internet or private network such as a local area network (LAN)). The clients 102 may include personal computers, laptops, PDAs, mobile phones, network appliances, etc. The servers 104 may include email servers, web servers or any other servers exchanging data with clients 102. The servers 104 may reside on the same or different machines (e.g., a server computer system, a gateway, a personal computer, etc.).

A network device 108 is placed on the network where it can watch network traffic including, for example, web requests and messages sent and received by the clients 102 and servers 104. Messages may be email messages, instant messaging (IM) messages, messages exchanged during telnet sessions, messages exchanged during file transfer protocol (FTP) sessions, etc. The network device 108 may be a sniffer or any other computing device capable of capturing traffic passing over the network 106.

The network device 108 hosts a data loss prevention (DLP) system 110 that scans captured traffic for presence of sensitive information maintained by an organization. Sensitive information may include, for example, customer, employee, patient or pricing data, design plans, source code, CAD drawings, financial reports, human resources reports, customer or patient reports, pricing documentation, corporate mergers and acquisitions documentation, government (e.g. Securities and Exchange Commission) filings, and any other sensitive information that requires restricted user access. The DLP system 110 scans captured network traffic according to DLP policies. A DLP policy includes rules for scanning content to detect the presence of sensitive information. The rules may identify the sensitive information that the content should be scanned for, specify conditions for triggering a policy violation (e.g., upon detecting sensitive information in 3 email messages of the same sender), provide scanning exceptions (e.g., to refrain from scanning an email message if the recipient of the email message is an organization's CEO), etc. The content to be scanned may be a file, an email message, a text message, a web request or any other data item that is part of network traffic captured by the network device 108. The network device 108 includes network adapter cards and/or packet capture software which record network traffic to designated buffers. Because of the large amount of network traffic, the buffers periodically become full, causing some of the data segments to be lost.

In one embodiment, the DLP system 110 includes a partial data stream subsystem 112 that enables DLP monitoring of partial data streams that include lost segments. In particular, the partial data stream subsystem 112 may first identify partial data streams containing lost segments by re-assembling segments into data streams (e.g., using transport layer headers of the segments) and determining that some data streams have missing segments. Due to missing segments, a partial data stream may lack information identifying the type of different elements of the partial data stream. The data stream elements include headers of different protocols and applications, and content portions (e/g/. email body portions, email attachment portions, etc.). The headers may include, for example, transport layer protocol headers (e.g., a transmission control protocol (TCP) header, a user datagram protocol (UDP) header, etc.), application layer protocol headers (e.g., an hypertext transfer protocol (HTTP) header, a simple mail transfer (SMTP) header, etc.), application headers (e.g., an email header, a Web 2.0 application header, etc.), and data presentation headers (e.g., zip file headers, multi-part forms headers, etc.). Headers provide information identifying characteristics of respective content portions such as the location of a content portion in the data stream, the length of a content portion, the type of a content portion, and the format of a content portion.

The partial data stream subsystem 112 analyzes the data stream elements to determine their type, parses the data stream elements according to the determined type, and extracts characteristics of respective content portions of a partial data stream. Based on these characteristics, the partial data stream subsystem 112 can locate the content portions present in the partial data stream, pad the content portions of lost segments, and identify which of the content portions present in the partial data stream require transformation and the type of the required transformation (e.g., decompression or decoding). The partial data stream subsystem 112 may then transform the content portions if needed (e.g., using a hybrid transformation engine specialized in partial data operations), and scan the resulting content for the presence of sensitive information according to a DLP policy. When scanning the content, the partial data stream subsystem 112 does not use the actual source data (the actual sensitive information) but rather fingerprints of the source data, to avoid exposing the sensitive information and to facilitate more efficient searching of the content. Fingerprints may include hashes of source data, encrypted source data, or any other signatures uniquely identifying the source data. If the scanned content includes sensitive information, the partial data stream subsystem 112 may report a violation of a DLP policy, along with the percentage of missing content in the partial data stream.

Figure 2:
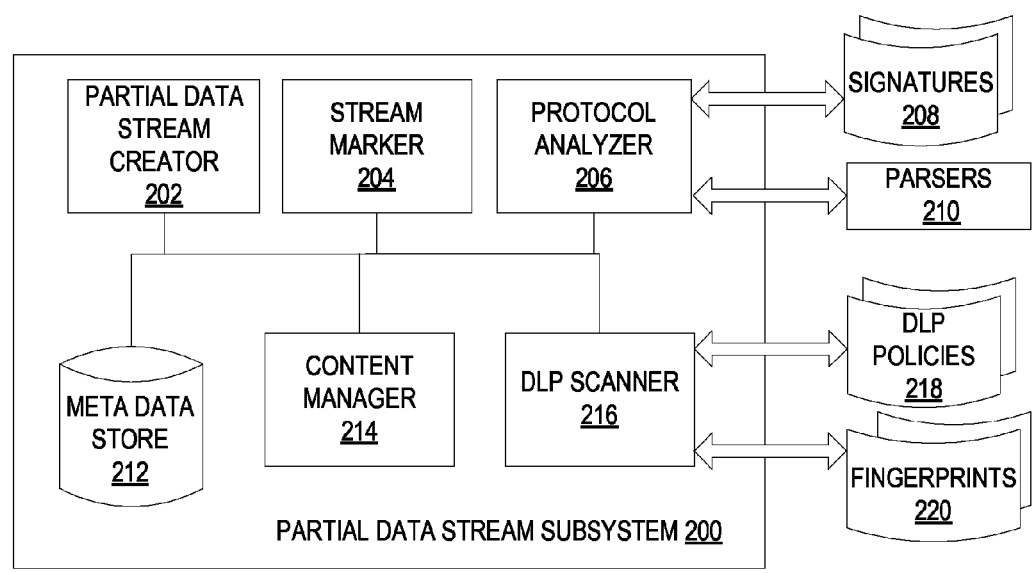
FIG. 2 illustrates processing of partial data streams in accordance with some embodiments of the invention.

FIG. 2 is a block diagram of one embodiment of a partial data stream subsystem 200. The partial data stream subsystem 200 may include a partial data stream creator 202, a stream marker 204, a protocol analyzer 206, a metadata store 212, a content manager 214, and a DLP scanner 216. The components of the partial data stream subsystem 200 may represent modules that can be combined together or separated into further modules, according to some embodiments.

The partial data stream creator 202 is responsible for re-assembling captured data segments into data streams (e.g., using sequence numbers contained in TCP headers and segment source and destination data), creating data streams from re-assembled data segments (e.g., using SYN/ACK and FIN TCP messages), and detecting segments that are missing from a data stream. In one embodiment, the partial data stream creator 202 associates each partial data stream with a session (e.g., by creating a session in response to a TCP control message or by creating a session for a connection tuple (a source address/port and a destination address/port) if the TCP control message is lost). The stream marker 204 inserts a begin and end marker at the location of each lost segment in a partial data stream, and records the location of each lost segment in the metadata store 212.

The protocol analyzer 206 processes data stream elements of a partial data stream to determine their type. The data stream elements may include transport layer headers (e.g., TCP headers, UDP headers, etc.), application layer headers (e.g., application layer protocol headers such as HTTP header, SMTP headers, etc., and application headers such as email headers, weblog headers, etc.), presentation layer headers (e.g., zip file headers, multipart forms headers, etc.), and content portions (e.g., an email body, an email attachment, a blog post, etc.). The type of a current data stream element may be unknown due to a lost data segment. For example, a client sending a webmail message may divide the webmail message into 5 portions, resulting in 5 data segments. The second data segment may have an HTTP header including the HTTP identifier. The HTTP headers of subsequent data segments may include various other information (e.g., portions of a cookie containing the body of the webmail message) but not the HTTP identifier. If the second data segment is lost, the identity of HTTP headers of subsequent data segments will no longer be apparent. The protocol analyzer 206 addresses the lack of identity for a current data stream element by utilizing signatures 208 that may be stored in a signature data store. The signatures 208 may include signatures of various protocol headers and signatures of various content formats (e.g., formats of email messages, multipart forms, blogs, etc.). Signatures 208 have corresponding parsers 210 that understand the format of specific protocols. Upon finding a matching signature 208 for the data stream element, the protocol analyzer 206 parses the data stream element using a corresponding parser 210 to extract metadata contained in the data stream element. Upon reaching the end of the current data stream element, the protocol analyzer 206 moves to the next data stream element present in the partial data stream, processes the next data stream element in a similar manner and then repeats these operations until all the data segments present in the partial data stream are processed. Examples of protocol detection operations will be discussed in more detail below. Metadata collected during processing of the data stream elements is stored in the metadata store 212 and may include, for example, an identifier of the type of a data stream element, a sender and a recipient of a partial data stream, characteristics of content portions of the partial data stream (e.g., the location of each content portion present in the partial data stream, the length of each content portion present in the partial data stream, the type of each content portion present in the partial data stream, the type of transformation (when needed) for a content portion present in the partial data stream), the start and end location of each lost segment, etc.

The content manager 214 uses the metadata in the metadata store 212 to determine the location and type of content portions present in a partial data stream and the type of transformation for these content portions if needed. In addition, the content manager 214 uses the metadata to identify content portions of lost segments and pads these content portions accordingly. If transformation of any content portions present in the partial data stream is required, the content manager 214 performs the required transformation. Examples of transformation operations will be discussed in more detail below.

The DLP scanner 216 scans partial data streams using fingerprints 220 of sensitive data. The scanning may be performed in accordance with DLP policies 218. In addition, DLP policies may define when a policy violation should be triggered (e.g., the number of fingerprint matches to trigger a policy violation, a sender or recipient exception, etc.). The fingerprints 220 may be stored in a fingerprint store. The DLP policies 218 may be stored in a DLP policy store. The metadata store 212, the signature store, the fingerprint store and DLP policy store may represent a single data structure or multiple data structures (databases, repositories, files, etc.) residing on one or more mass storage devices, such as magnetic or optical storage based disks, solid-state drives or hard drives.

The DLP scanner 216 may ignore content portions of lost segments when scanning the partial content. Examples of partial DLP scanning operations will be discussed in more detail below. When the DLP scanner 216 detects a violation of a DLP policy 218, it creates a DLP alert, which may include a percentage of missing content in the partial data stream to indicate the reliability of the alert.

Figure 3:
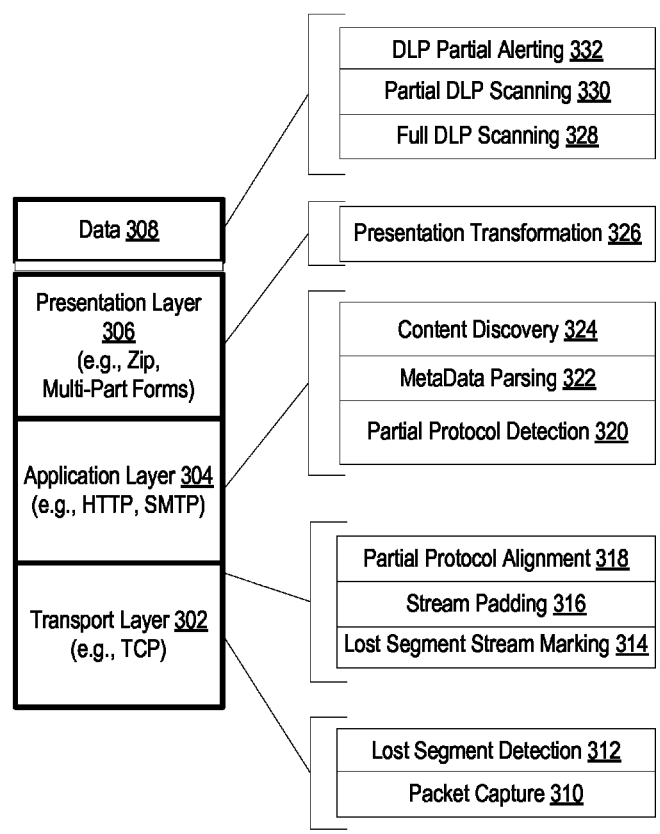
FIG. 3 is a block diagram of one embodiment of a partial data stream subsystem.

FIG. 3 illustrates processing of partial data streams in accordance with some embodiments of the invention. A partial data stream may include data stream elements of different layers such as transport layer elements (e.g., TCP headers, UDP headers, etc.) 302, application layer elements (e.g., application layer protocol headers such as HTTP header, SMTP headers, etc., and application headers such as email headers, weblog headers, etc.) 306, presentation layer elements (e.g., zip file headers, multipart forms headers, etc.) 306, and content elements (e.g., an email body, an email attachment, a blog post, etc.) 308. At each layer, metadata is recorded and stored in a metadata store. Metadata collected at each layer may be used as a hint for processing at a subsequent layer.

In one embodiment, processing performed at the transport layer 302 includes packet capturing 310 and lost segment detection 312. In other embodiments, in which a transport layer protocol used for packet communication does not provide sequence numbers of data segments (e.g., UDP), packet capturing 310 and lost segment detection 312 are performed during processing at the application layer 304.

Packet capturing 310 may include capturing data segments and re-assembling the data segments into data streams using, for example, sequence numbers contained in segment headers (e.g., TCP headers). In one embodiment, when a missing segment is detected, it is placed on a lost segment queue for a predefined time period (e.g., by setting a timer) or until a TCP close connection (FIN) message is received. A TCP Control (SYN/ACK) message may be used to determine when to create a data stream associated with a specific connection tuple (destination address/port and source address/port). Lost segment detection 312 may be invoked on time outs of the lost segment queue. Lost segment detection 312 pulls off all recorded segments for a specific session, creates a session if one does not exist (e.g., if the TCP control segment was lost) or migrates a data stream to a previously created session if the data stream includes information (e.g., in a cookie of an HTPP header) identifying the data stream as an active stream.

In one embodiment, processing performed at the application layer 304 includes lost segment stream marking 314, stream padding 316, partial protocol alignment 318, partial protocol detection 320, metadata parsing 322 and content discovery 324. Lost segment stream marking 314 inserts a begin and end stream marker at each specific point where a lost segment is detected, and stores the location of the begin and end stream marker in the metadata store. Stream padding 316 uses stream markers to provide padding. In one embodiment, stream padding 316 is performed prior to processing application layer headers (i.e., prior to partial protocol alignment 318 and partial protocol detection 320). Alternatively, stream padding 316 is performed after the partial protocol detection 320 is completed and the content portions of the partial data stream are discovered. In this alternative embodiment, partial protocol alignment 318 and partial protocol detection 320 use the stream markers for determining the delimiters of the parsing context, and do not use padding to avoid unneeded overhead.

Partial protocol alignment 318 is performed to assist partial protocol detection 320 in determining the type of application layer headers where this information is not readily available (e.g., is not provided in data stream elements of prior layers or in a current data stream element). Partial protocol detection 320 determines the header type using different signatures associated with specific protocols. During partial data stream processing, the stream may transition from/to multiple protocols (e.g., from a TCP header to an HTTP header, from the HTTP header to a Web 2.0 application email header, from the Web 2.0 application email header to a zip file header, and so on). Protocol headers generally use common delimiters that indicate when a new field or header tag is available. Partial protocol alignment 318 identifies the delimiters and aligns the stream to start at the first possible "protocol tag" that may be recognized by protocol signature processing. Since multiple delimiter indicators may reside in a single data stream, partial protocol alignment 318 aligns and dispatches each possible "start" location to partial protocol detection 320 for protocol signature processing until partial protocol detection 320 completes the processing of the partial data stream.

Partial protocol detection 320 applies various signatures associated with different protocols to different data stream elements of the partial data stream. In one embodiment, partial protocol detection 320 uses signatures that reflect extended attributes of protocols to ascertain the protocol identity. Existing signature identity techniques use the format of a protocol header to establish the type of protocol being used. For example, signature detection of HTTP would use the string "GET <URI> HTTP/1.1\r\n" to identify this protocol. However, if a data segment including an HTTP header with the above string is lost, so is the HTTP identify for the existing signature identity techniques. Embodiments of the present invention solve this limitation by utilizing signatures that reflect the full protocol specification (e.g., full HTTP tag specification), including not only the primary protocol attributes, but also additional, subordinate tags (e.g., HTTP tags such as "Keep-Alive", "Connection," "Content-Type" and others). In one embodiment, partial protocol detection 320 validates the protocol signature using a combination of header format (e.g., based on an HTTP connection tag "Connection: keep-alive\r\n") and the presence of additional tags. Partial protocol detection 320 uses signatures that reflect extended protocol attributes for various protocols, including text based protocols as well as binary protocols. Once the protocol is identified, a corresponding parser is used to parse the data stream element. The data stream elements being analyzed and parsed by partial protocol detection 320 may include application layer protocol headers (e.g., HTTP or SMTP headers), application headers (e.g., email headers or weblog headers), and presentation layer headers (e.g., zip file headers or multipart forms headers). By transitioning from header to header, partial protocol detection 320 parses the headers using corresponding parsers and extracts metadata necessary for processing at subsequent layers. In one embodiment, if the collected metadata is not sufficient to discover a respective content portion or to identify the type of the content, partial protocol detection 320 continues its processing by applying signatures to the content portion to determine the type of the content portion (e.g., the type of the body of an email message or the type of an email attachment).

Metadata parsing 322 records metadata extracted by parsers. The metadata may include sender and recipient information (e.g., embedded in an HTTP header for a specific application such as Facebook), the location of a lost segment, the location of a content portions present in the partial data stream, the length of a content portion (e.g., the body of an email message that may contain partial data due to lost segments), the type of a content portion, and the type of transformation used for a content portion (e.g., the type of compression or encoding) if applicable. In addition to content characteristics, the metadata may include characteristics of different headers present in the partial data stream (e.g., the type, the length, etc.). Metadata parsing 322 collects metadata at different layers of partial data stream processing and this information aids in the processing of the next layer(s). In particular, the metadata may be used as "hints" when subsequent processing is being performed. For example, if the metadata identifies two previous data stream elements of a data segment as an HTTP header and an SMTP header, then the current data stream element of the data segment is likely to be a webmail header.

Content discovery 324 determines the location and type of content portions present in a partial data stream and defines the level of decoding and/or marshalling for these content portions if applicable. Content discovery 324 may also pad content portions of lost segments in the partial data stream. For example, when dealing with multi-part forms, portions of a lengthy payload may result in a partial data set, and such a loss may be represented using padding and tagging of the stream location in the metadata store. In one embodiment, content discovery 324 labels the content portions present in the partial data stream as valid and the padded portions as invalid to let subsequent operations (e.g., DLP scanning) know which portions can be ignored. Metadata from layers below may be used to determine the presence (or lack of presence) of the content to be transformed. Content discovery 324 may identify user-configurable or predefined methods for subsequent processing of different types of content, where subsequent processing may include transformation of fully available content or partial content, and DLP scanning of content.

In one embodiment, processing performed at the presentation layer 306 includes presentation transformation 326 that is responsible for transforming content of partial data streams. Content that is fully available may be transformed using a standard transformation process (e.g., gzip decompression, etc.). For partial content, presentation transformation 326 may use hybrid transformation engines, which are specialized for partial data operations, understand the limitation of the content such as multipart forms, compressed data and encoded data, and transform the content accordingly.

In one embodiment, processing performed at the data (content) layer 308 includes full DLP scanning 328, partial DLP scanning 330 and DLP partial alerts 332. Full DLP scanning 328 is used to scan fully available content of data streams for sensitive information using fingerprints of sensitive information. In the event of partial data content, partial DLP scanning 330 is used that is configured to understand the metadata derived during protocol and content analysis. Partial DLP scanning 330 uses the metadata to calculate the acceptance level of the partial content (e.g., to calculate how significant the size of missing content is) and to define the fingerprint matching criteria during DLP scanning (e.g., a match should be triggered when the similarity between the partial content and a fingerprint is at least 75%). Metadata, via stream markers, is also used to indicate portions of content which should be ignored and also to provide relative content/fingerprint intersections for which scanning should continue.

In one embodiment, when partial DLP scanning 330 processes data that does not need to be transformed, partial DLP scanning 330 uses pattern matching techniques to locate the next valid data intersection between the original content fingerprint and the partial set (when possible). In one embodiment, in which partial DLP scanning 330 uses k-gram fingerprints (i.e., a fingerprint of a set of k characters), the metadata is used to align a k-gram fingerprint with an appropriate portion of content and to ignore k-gram fingerprints corresponding to the missing content portions.

In one embodiment, when partial DLP scanning 330 processes decompressed data, it uses metadata to ascertain the specific file under evaluation. The metadata used for this purpose may be a file name via an attachment tag and other such indicators. Once the identity of the file is determined, the scanning may be performed using pattern matching techniques and/or k-gram fingerprints as discussed above. For all scanning techniques, the percentage of matches versus the amount of missing data can be defined as a function of measure to provide granularity/weight during the decision calculation for alerting.

DLP partial alerting 332 creates an alert when a violation of a DLP policy is detected. Depending on the rules of a DLP policy, a violation may be triggered when, for example, a fingerprint match is detected in a single message, or when a fingerprint match is detected in at least N messages sent by the same sender, or when a fingerprint match is detected in a message sent to a certain recipient, and so on. An alert created by DLP partial alerting 332 may include additional information that defines the level and/or percentage and/or the amount of the data analyzed such that the probability of loss can be determined versus its false positive (FP) probability. This additional information indicates the reliability of the alert.

FIGS. 4 through 7 are flow diagrams illustrating methods performed by a network device (e.g., a network device 108 of FIG. 1) in accordance with some embodiments of the invention. The methods are performed by processing logic that may comprise hardware (circuitry, dedicated logic, etc.), software (such as is run on a general purpose computer system or a dedicated machine), or a combination of both.

Figure 4:
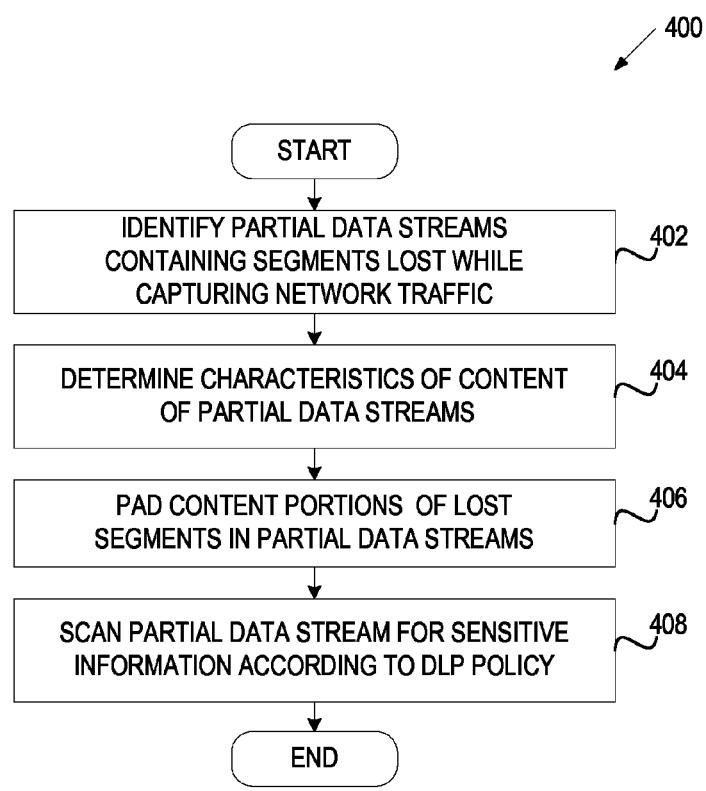
FIG. 4 is a flow diagram of one embodiment of a method for data loss monitoring of partial data streams.

FIG. 4 is a flow diagram of one embodiment of a method 400 for data loss monitoring of partial data streams. Method 400 can start with the network device identifying partial data streams containing lost segments (block 402). Partial data streams may be identified using transport layer protocol headers or application layer protocol headers. One embodiment of a method for identifying partial data streams using TCP headers will be discussed in more detail below in conjunction with FIG. 5.

At block 404, the network device determines characteristics of content of partial data streams. The characteristics of content of a partial data stream may include the location of content portions present in a partial data stream, the length of each content portion present in the partial data stream, the type of each content portion present in the partial data stream, the type of transformation needed for content portions present in the partial data stream (if applicable), and the location of content portions of lost segments in the partial data stream. Some embodiments of a method for determining characteristics of content of a partial data stream will be discussed in more detail below in conjunction with FIGS. 6 and 7.

Based on the determined content characteristics, the network device discovers the content portions present in the partial data stream, and pads content portions of lost segments in the partial data stream (block 406). When applicable, the network device transforms (e.g., decompresses or decodes) the content of the partial data stream. One embodiment of a method for transforming content of a partial data stream will be discussed in more detail below in conjunction with FIG. 8.

At block 408, the network device scans the partial data streams for sensitive information according to one or more DLP policies. The network device may perform scanning using fingerprints of sensitive information, and may generate DLP alerts that identify violations of DLP policies. A DLP alert may also specify the percentage of missing content in a partial data stream to indicate the reliability of the DLP alert. One embodiment of a method for DLP scanning of a partial data stream will be discussed in more detail below in conjunction with FIG. 9.

Figure 5:
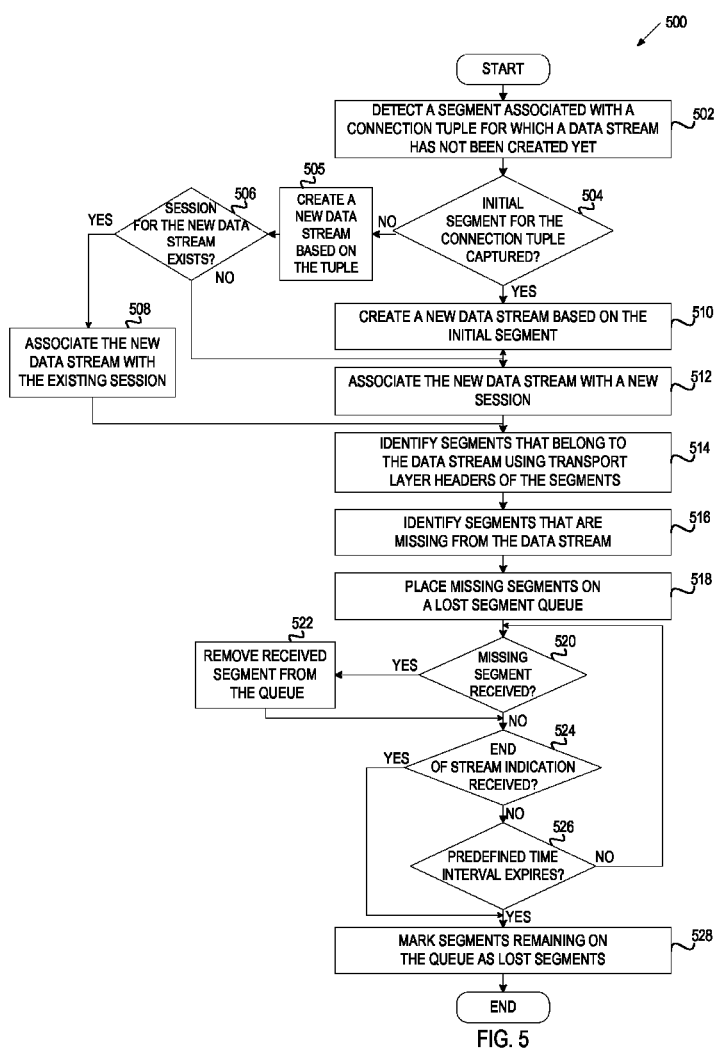
FIG. 5 is a flow diagram of one embodiment of a method for identifying partial data streams containing lost segments.

FIG. 5 is a flow diagram of one embodiment of a method 500 for identifying partial data streams containing lost segments. Method 500 begins with the network device detecting a segment associated with a connection tuple (a source address/port and a destination address port) for which a data stream has not been created yet (block 502). At block 504, the network device determines if an initial segment (e.g., the TCP control (SYN/ACK) segment) associated with this connection tuple exists (e.g., either the detected segment is the TCP control segment or there is a corresponding TCP control segment in the buffer). If the initial segment associated with the identified connection tuple exists, the network device creates a new data stream based on the initial segment (block 510), associates the new data stream with a new session (block 512) and proceeds to block 514.

If the initial segment associated with the identified connection tuple does not exists (i.e., it was lost), the network device creates a new data stream based on the connection tuple (block 505) and determines whether a session for this data stream already exists (block 506). If the session for this data stream does not exist, the network device associates the data stream with a new session (block 512), and proceeds to block 514. If the session for this data stream already exists, the network device associates the data stream with the existing session (block 508) and proceeds to block 514.

At block 514, the network device identifies segments that belong to the data stream using transport layer headers of the segments (e.g., sequence numbers in TCP headers of data segments). At block 516, the network device identifies segments that are missing from the data stream. At block 518, the network device places the missing segments on a lost segment queue. If a segment placed on the queue is captured (block 520), the network device removes this segment from the queue (block 522), and proceeds to block 524.

At block 524, the network device determines whether an end of stream indication is received (e.g., as a TCP FIN message). If so, method 500 proceeds to block 528. If not, the network device determines whether a predefined time interval has expired (block 526). If so, method 500 proceeds to block 528. If not, method 500 returns to block 520. At block 528, the network device marks segments that remain on the lost segment queue as lost segments.

Figure 6:
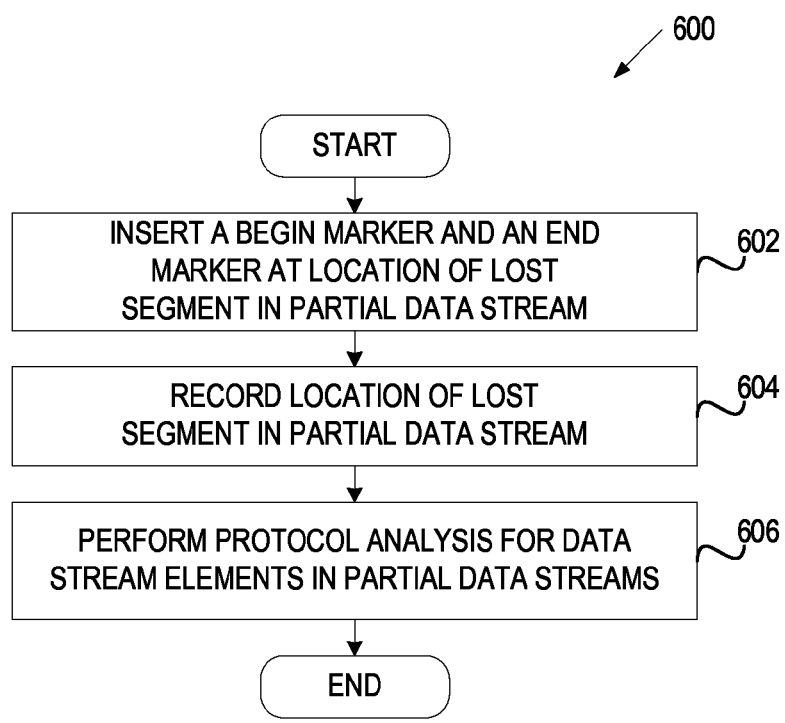
FIG. 6 is a flow diagram of one embodiment of a method for determining characteristics of content of a partial data stream.

FIG. 6 is a flow diagram of one embodiment of a method 600 for determining characteristics of content of a partial data stream. Method 600 starts with the network device inserting a begin marker and an end marker at the location of each lost segment in the partial data stream (block 602). At block 604, the network device records the location of each lost segments in a metadata store.

At block 606, the network device performs protocol analysis for data stream elements of partial data streams. Protocol analysis includes determining the type of data stream elements of the partial data stream, and parsing the data stream elements using corresponding parsers to extract metadata from the data stream elements. One embodiment of a protocol analysis method will be discussed in more detail below in conjunction with FIG. 7.

Figure 7:
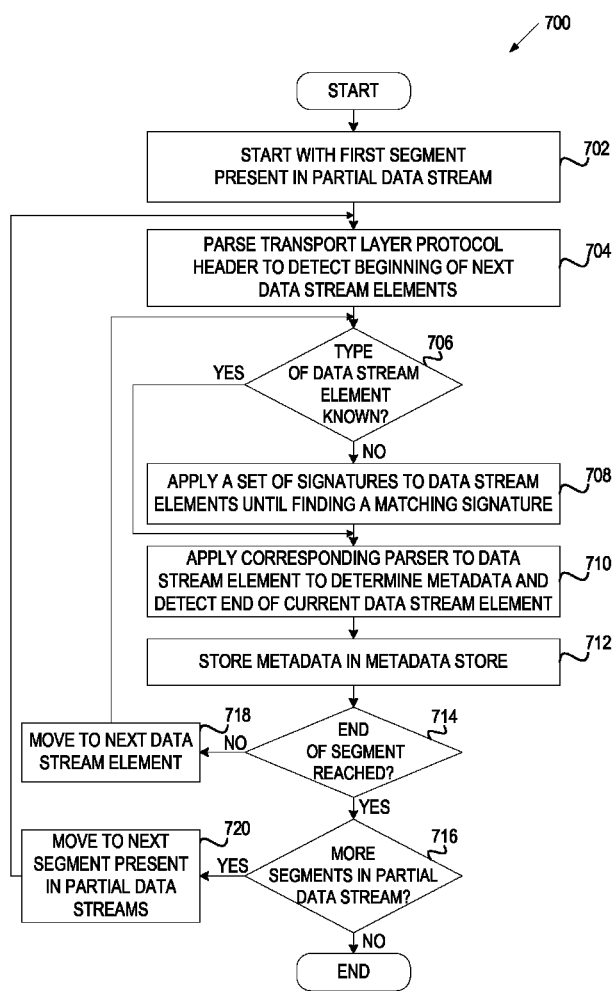
FIG. 7 is a flow diagram of one embodiment of a method for performing protocol analysis for data stream elements of a partial data stream.

FIG. 7 is a flow diagram of one embodiment of a method 700 for performing protocol analysis for data stream elements of a partial data stream. Method 700 begins with the network device identifying the first data segment present in the partial data stream (block 702). At block 704, the network device parses a transport layer protocol header (e.g., the TCP header) of the first data segment to identify the beginning of a next data stream element (e.g., the beginning of an application layer protocol header such as an HTTP header, an SMTP header, etc.). At block 706, the network device determines whether the type of the next data stream element is known (e.g., whether the next data stream element includes an identifier of its type or the previous data stream element included an identifier of the next data stream element).

If the type of the data stream element is known, the network device applies a corresponding parser to the data stream element to extract metadata and to detect the end of the data stream element (block 710). If the type of the data stream element is unknown, the network device applies a set of signatures to the data stream element until finding a matching signature (block 708), and then applies a corresponding parser to the data stream element to extract metadata and to detect the end of this data stream element (block 710). In one embodiment, prior to applying the signatures, the network device identifies common delimiters that indicate when a new field or header tag is available, and aligns the stream to start at the first possible protocol tag that may be recognized by protocol signature processing. Since multiple delimiter indicators may reside in a single data stream, each possible start location may be used to apply the signatures. In one embodiment, the network device uses signatures that reflect extended attributes of protocols to ascertain the protocol identity. The protocol signature may be validated using a combination of header format (e.g., based on an HTTP connection tag "Connection: keep-alive\r\n") and the presence of additional tags. The data stream elements being analyzed and parsed may include application layer protocol headers (e.g., HTTP or SMTP headers), application headers (e.g., email headers or weblog headers), and presentation layer headers (e.g., zip file headers or multipart forms headers).

At block 712, the network device stores metadata extracted during parsing in the metadata store. The metadata may include the type of the data stream element (e.g., an HTTP header, an SMTP header, an email header, a Facebook header, a zip file header, etc.), sender and recipient information (e.g., embedded in an HTTP header for a specific application such as Facebook), the location of a lost segment, the location of a content portion present in the partial data stream, the length of a content portion (e.g., the body of an email message that may contain partial data due to lost segments), the type of a content portion, and the type of transformation used for a content portion (e.g., type of compression or encoding) if applicable.

Once the parsing of the data stream element is completed, the network device may determine whether the current data segment includes any other data stream elements (block 714). If so, the network device moves to the next data stream element of the data segment (block 718) and returns to block 706. In one embodiment, if the next data stream element is a content portion of the data segment, the network device determines whether the collected metadata includes enough information about the content portion (e.g., the length of the content portion, the type of the content portion, and the transformation needed for the content portion). If so, the network device skips the processing of the content portion and proceeds to block 716. If not, the network device processes the content portion at blocks 706 through 714, and proceeds to block 716.

At block 716, the network device determines whether the partial data stream includes more data segments that have not been processed yet (block 716). If not, method 700 ends. If so, the network device moves to the next segment present in the partial data streams (block 720) and returns to block 704.

Figure 8:
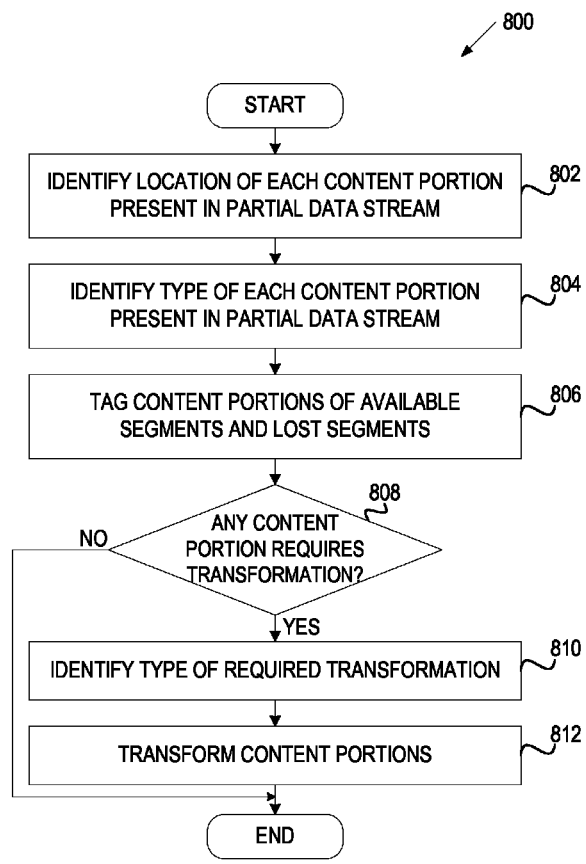
FIG. 8 is a flow diagram of one embodiment of a method for transforming content of a partial data stream.

FIG. 8 is a flow diagram of one embodiment of a method 800 for transforming content of a partial data stream. Method 800 starts with the network device determining the location of each content portion present in a partial data stream (block 802) and the type of each content portion present in the partial data stream (block 804). The network device makes this determination using metadata stored in a metadata store.

At block 806, the network device tags content portions of data segments present in the partial data stream as valid and tags padded content portions of lost data segments as invalid to indicate what portions should be scanned and what portions should be ignored during DLP scanning. At block 808, the network device determines whether any content portions require transformation. If not, method 800 ends. If so, the network device identifies the type of required transformation (block 810) and transforms the corresponding content portions present in the partial data stream (block 812). In some embodiments, hybrid transformation engines, which are specialized for partial data operations and understand the limitation of the content such as multipart forms, compressed data and encoded data, are used for transforming partial content. The use of transformation engines may be configurable (e.g., based on user-specified data) for different types of content.

Figure 9:
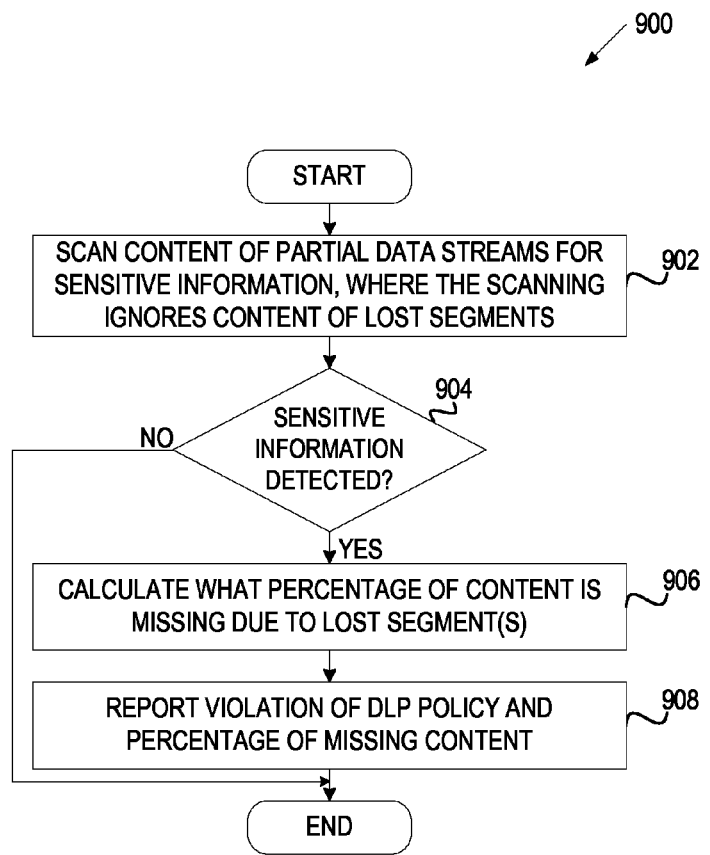
FIG. 9 is a flow diagram of one embodiment of a method for detecting DLP policy violations in partial data streams.

FIG. 9 is a flow diagram of one embodiment of a method 900 for detecting DLP policy violations in partial data streams. At block 902, the network device scans content of a partial data stream for sensitive information (block 902). If content of the partial data stream is fully available, the network device scans the content using fingerprints of sensitive information. If some portions of content are missing, the network device may determine the acceptance level of the partial content (e.g., how significant the size of missing content is) and define the fingerprint matching criteria during DLP scanning (e.g., a match should be triggered when the similarity between the partial content and a fingerprint is at least 75%). In one embodiment, when the content being scanned does not need to be transformed, the network device uses pattern matching techniques to locate the next valid data intersection between the original content fingerprint and the partial set. In one embodiment, the network device uses k-gram fingerprints and aligns a k-gram fingerprint with an appropriate portion of content based on the metadata, ignoring k-gram fingerprints corresponding to the missing content portions. Alternatively, when the content being scanned includes decompressed data, the network device uses metadata to ascertain the specific file under evaluation. The metadata used for this purpose may be a file name via an attachment tag and other such indicators. Once the identity of the file is determined, the scanning may be performed using pattern matching techniques and/or k-gram fingerprints as discussed above.

At block 904, the network device determines whether the partial data stream includes sensitive information. If not, method 900 ends. If so, the network device calculates what percentage of content is missing due to lost segments (block 906). In addition, the network device may calculate the percentage of matches versus the amount of missing data. At block 908, the network device reports a violation of a DLP policy and the percentage of missing content. In addition, the percentage of matches versus the amount of missing data may be reported as well.

Figure 10:
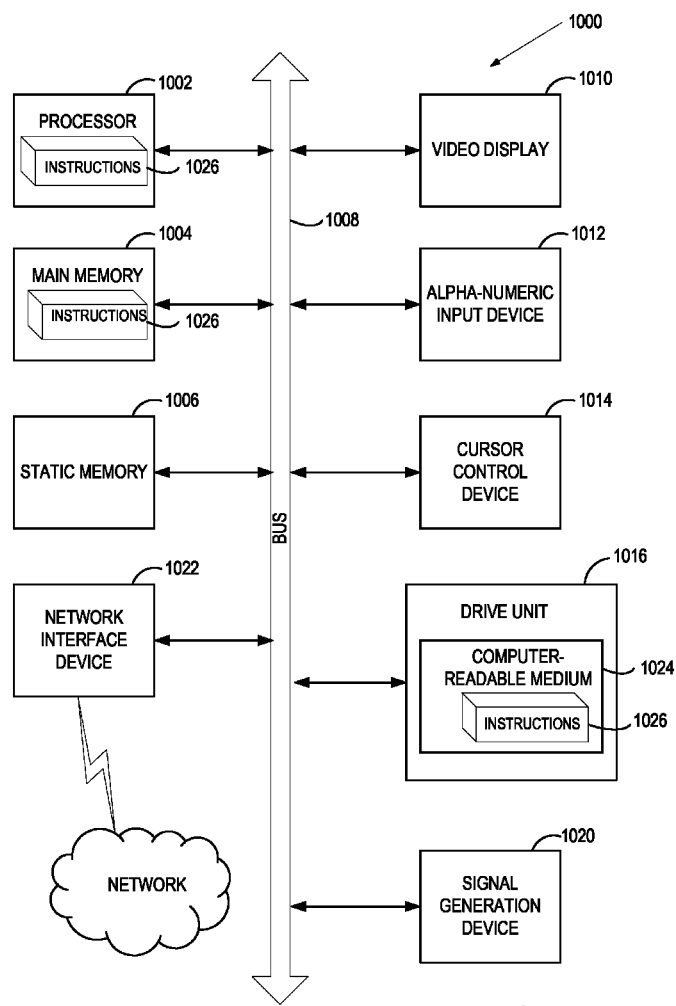
FIG. 10 illustrates a diagrammatic representation of a machine in the exemplary form of a computer system.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a sniffer, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a data storage device (e.g., a drive unit) 1016, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute the processing logic (e.g., instructions) 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1016 may include a computer-readable medium 1024 on which is stored one or more sets of instructions (e.g., software) 1026 embodying any one or more of the methodologies or functions described herein. The software 1026 may also reside, completely or at least partially, within the main memory 1004 and/or within the processor 1002 during execution thereof by the computer system 1000, the main memory 1004 and the processor 1002 also constituting computer-readable media. The software 1026 may further be transmitted or received over a network 1020 via the network interface device 1022.

While the computer-readable medium 1024 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, optical media, and magnetic media.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "applying", "refraining", "scanning", "updating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer selectively activated or reconfigured by a computer program stored in the computer. As discussed above, such a computer program may be stored in a computer readable medium.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A computer-implemented method comprising:
identifying partial data streams containing segments lost while capturing network traffic at a network computing device, each partial data stream corresponding to a session;
determining characteristics of the partial data streams, wherein determining characteristics of the partial data streams comprises performing a protocol analysis for data stream elements of a partial data stream by determining a type for each data stream element, parsing each data stream element based on the type to extract metadata, and storing the metadata in a metadata store;
padding content portions of the lost segments in the partial data streams to generate padded partial data streams; and
scanning the padded partial data streams for sensitive information according to at least one data loss prevention (DLP) policy, wherein scanning the padded partial data streams comprises using signatures of the sensitive information to determine whether content portions of the padded partial data streams contain the sensitive information.

2. The computer-implemented method of claim 1, wherein identifying partial data streams comprises:
capturing the network traffic containing a plurality of segments at the network computing device;
creating a data stream each time a segment is identified as a first segment in the data stream based on a transport layer header of the segment;
associating the data stream with a session;
identifying segments that belong to the data stream using transport layer headers of the segments;
identifying segments that are missing from the data stream;
placing the missing segments on a lost segment queue; and upon receiving an end of stream indication or upon an expiration of a predefined time interval, marking the segments remaining on the lost segment queue as lost segments.

3. The computer-implemented method of claim 2, further comprising:
identifying a data segment associated with a connection tuple for which a data stream has not been created;
determining that a first segment associated with the connection tuple has been lost;
creating a partial data stream based on the connection tuple;
determining whether the partial data stream belongs to a previously created session;
if the partial data stream does not belong to the previously created session, associating the partial data stream with a new session; and
if the partial data stream belongs to the previously created session, migrating the partial data stream to the previously created session.

4. The computer-implemented method of claim 1, wherein determining characteristics of the partial data streams further comprises:
after identifying a lost segment, inserting a begin marker and an end marker at a location of the lost segment in the partial data stream; and
recording the location of the lost segment in the metadata store.

5. The computer-implemented method of claim 4, wherein determining the type for each data stream element comprises:
if the type of the data stream element is known, identifying a parser corresponding to the type of the data stream element; and
if the type of the data stream element is not known,
applying a plurality of signatures to the data stream element until finding a matching signature, each of the plurality of signatures corresponding to a particular type,
identifying the type of the data stream element using the matching signature, and
identifying a parser corresponding to the type of the data stream element.

6. The computer-implemented method of claim 4, wherein applying a plurality of signatures to the data stream element comprises:
aligning the data stream element to start at a first possible header tag;
applying the plurality of signatures at each possible header tag; and
identifying a header type using the matching signature.

7. The computer-implemented method of claim 6, wherein:
the header type is an application layer protocol header; and
the metadata extracted from the application layer protocol header comprises at least one of sender information, recipient information, a data type and a data length.

8. The computer-implemented method of claim 6, wherein:
the header type is a presentation layer header; and
the metadata extracted from the presentation layer header comprises a data format.

9. The computer-implemented method of claim 6, wherein the matching signature uses a header format and a plurality of tags associated with the header type, the plurality of tags comprising a plurality of primary tags and a plurality of additional tags.

10. The computer-implemented method of claim 5, wherein identifying the type of the data stream element further comprises:
utilizing metadata collected when identifying a type of a prior data stream element of the data stream.

11. The computer-implemented method of claim 4, wherein padding the content portion of lost segments in the partial data stream to generate padded partial data streams comprises:
identifying a location of each content portion present in the partial data stream;
identifying a type of each content portion present in the partial data stream;
tagging the content portion of each lost segment as invalid;
determining whether a transformation of any content portion present in the partial data stream is required; and
if the transformation of any content portion present in the partial data stream is required, identifying a type of the required transformation, and transforming the content portion using the identified type of the required transformation.

12. The computer-implemented method of claim 1, wherein scanning the padded partial data streams for sensitive information according to the at least one DLP policy comprises:
identifying portions of content that are missing; and
ignoring the portions of content that are missing when scanning the content for the sensitive information using signatures of the sensitive information.

13. The computer-implemented method of claim 12, wherein the content is scanned using k-gram signatures.

14. The computer-implemented method of claim 12, further comprising:
upon detecting the sensitive information in the padded partial data stream, reporting a violation of the DLP policy and a percentage of missing content in the padded partial data stream.

15. A non-transitory computer readable storage medium that provides instructions, which when executed on a computer system cause the computer system to perform a method comprising:
identifying partial data streams containing segments lost while capturing network traffic at a network computing device, each partial data stream corresponding to a session;
determining characteristics of the partial data streams, wherein determining characteristics of the partial data streams comprises performing a protocol analysis for data stream elements of a partial data stream by determining a type for each data stream element, parsing each data stream element based on the type to extract metadata, and storing the metadata in a metadata store;
padding content portions of the lost segments in the partial data streams to generate padded partial data streams; and
scanning the padded partial data streams for sensitive information according to at least one data loss prevention (DLP) policy, wherein scanning the padded partial data streams comprises using signatures of the sensitive information to determine whether content portions of the padded partial data streams contain the sensitive information.

16. The non-transitory computer readable storage medium of claim 15, wherein the method further comprises:
- after identifying a lost segment, inserting a begin marker and an end marker at a location of the lost segment in the partial data stream; and
- recording the location of the lost segment in the metadata store.

17. A network device comprising:
- a memory;
- a processing device, coupled to the memory; and
- a partial data stream subsystem, executed from the memory by the processing device, to:
  - identify partial data streams containing segments lost while capturing network traffic at a network computing device, each partial data stream corresponding to a session;
  - determine characteristics of the partial data streams, wherein determining characteristics of the partial data streams comprises performing a protocol analysis for data stream elements of a partial data stream by determining a type for each data stream element, parsing each data stream element based on the type to extract metadata, and storing the metadata in a metadata store;
  - pad content portions of the lost segments in the partial data streams to generate padded partial data streams; and
  - scan the padded partial data streams for sensitive information according to at least one data loss prevention (DLP) policy, wherein scanning the padded partial data streams comprises using signatures of the sensitive information to determine whether content portions of the padded partial data streams contain the sensitive information.

18. The network device of claim 17, wherein the partial data stream subsystem comprises:
- a protocol analyzer to perform the protocol analysis for data stream elements of a partial data stream using a plurality of signatures;
- the metadata store to store metadata extracted during the protocol analysis;
- a content manager to identify a location and a type of each content portion present in the partial data stream, to tag the content portion of each lost segment as invalid, and to transform any content portion present in the partial data stream that requires transformation; and
- a DLP scanner to identify portions of content that are missing, to ignore the portions of content that are missing when scanning the content for the sensitive information using signatures of the sensitive information, and to report a violation of the DLP policy and a percentage of missing content in the padded partial data stream upon detecting the sensitive information in a padded partial data stream.

* * * * *